United States Patent
Kearns et al.

(10) Patent No.: US 6,639,569 B2
(45) Date of Patent: Oct. 28, 2003

(54) INTEGRATED HEADS-UP DISPLAY AND CLUSTER PROJECTION PANEL ASSEMBLY FOR MOTOR VEHICLES

(75) Inventors: Jerry Gray Kearns, Belleville, MI (US); Mahendra Somasara Dassanayake, West Bloomfield, MI (US); Terry Thomas Cwik, Salem, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 09/736,931

(22) Filed: Dec. 14, 2000

(65) Prior Publication Data

US 2002/0075200 A1 Jun. 20, 2002

(51) Int. Cl.[7] ................................................ G09G 5/00
(52) U.S. Cl. .................... 345/7; 345/8; 345/9; 349/11
(58) Field of Search ............................. 345/7, 63, 102, 345/83, 165, 166; 349/11, 57; 385/86

(56) References Cited

U.S. PATENT DOCUMENTS

| | | | |
|---|---|---|---|
| 4,900,133 A | | 2/1990 | Berman |
| 5,013,135 A | * | 5/1991 | Yamamura |
| 5,296,868 A | | 3/1994 | Itami et al. |
| 5,361,165 A | | 11/1994 | Stringfellow et al. |
| 5,724,062 A | * | 3/1998 | Hunter |
| 5,729,366 A | | 3/1998 | Yang |
| 5,734,358 A | | 3/1998 | Sumiyoshi |
| 5,867,133 A | | 2/1999 | Toffolo et al. |
| 5,892,598 A | | 4/1999 | Asakawa et al. |
| 6,067,078 A | | 5/2000 | Hartman |
| 6,100,943 A | * | 8/2000 | Koide et al. |
| 6,219,480 B1 | * | 4/2001 | Cassarly et al. |

* cited by examiner

Primary Examiner—Matthew C. Bella
Assistant Examiner—Hau Nguyen

(57) ABSTRACT

An integrated heads-up display (HUD) and cluster projection panel assembly for a motor vehicle includes a housing and a display unit contained within the housing. The display unit has first and second pixel arrays which turn on and off for forming first and second image light beams in response to receiving light. A HUD unit is contained within the housing. The HUD unit has a first converter for transmitting light to the first pixel array of the display unit. The HUD unit further has a first projection optic for projecting the first image light beam from the first pixel array of the display unit onto a windscreen of the motor vehicle. A cluster projection panel unit is contained within the housing. The cluster projection panel has a second converter for transmitting light to the second pixel array of the display unit. The cluster projection panel unit further has a second projection optic for projecting the second image light beam from the second pixel array of the display unit onto a cluster projection screen of the motor vehicle.

9 Claims, 1 Drawing Sheet

INTEGRATED HEADS-UP DISPLAY AND CLUSTER PROJECTION PANEL ASSEMBLY FOR MOTOR VEHICLES

BACKGROUND OF THE INVENTION

1. Field of the Invention

The present invention relates generally to heads-up displays (HUD) and cluster panels for motor vehicles and, more particularly, to an integrated HUD and cluster projection panel assembly for a motor vehicle.

2. Background Art

A heads-up display (HUD) conveys information onto the windshield of a motor vehicle where the information is visible to the driver. A cluster projection panel conveys information onto the instrument panel of a vehicle where the information is visible to the driver. The information includes information about the road and the vehicle. A problem with having a HUD separate from a cluster projection panel is the added complexity and cost associated with two distinct units.

SUMMARY OF THE INVENTION

Accordingly, it is an object of the present invention to provide an integrated HUD and cluster panel assembly for a motor vehicle.

In carrying out the above object and other objects, the present invention provides an integrated heads-up display (HUD) and cluster projection panel assembly for a motor vehicle. The assembly includes a housing and a display unit contained within the housing. The display unit has first and second pixel arrays which turn on and off for forming first and second image light beams in response to receiving light. A HUD unit is contained within the housing. The HUD unit has a first converter for transmitting light to the first pixel array of the display unit. The HUD unit further has a first projection optic for projecting the first image light beam from the first pixel array of the display unit onto a windscreen of the motor vehicle. A cluster projection panel unit is contained within the housing. The cluster projection panel has a second converter for transmitting light to the second pixel array of the display unit. The cluster projection panel unit further has a second projection optic for projecting the second image light beam from the second pixel array of the display unit onto a cluster projection screen of the motor vehicle.

DETAILED DESCRIPTION OF THE PREFERRED EMBODIMENT(S)

Figure 1:
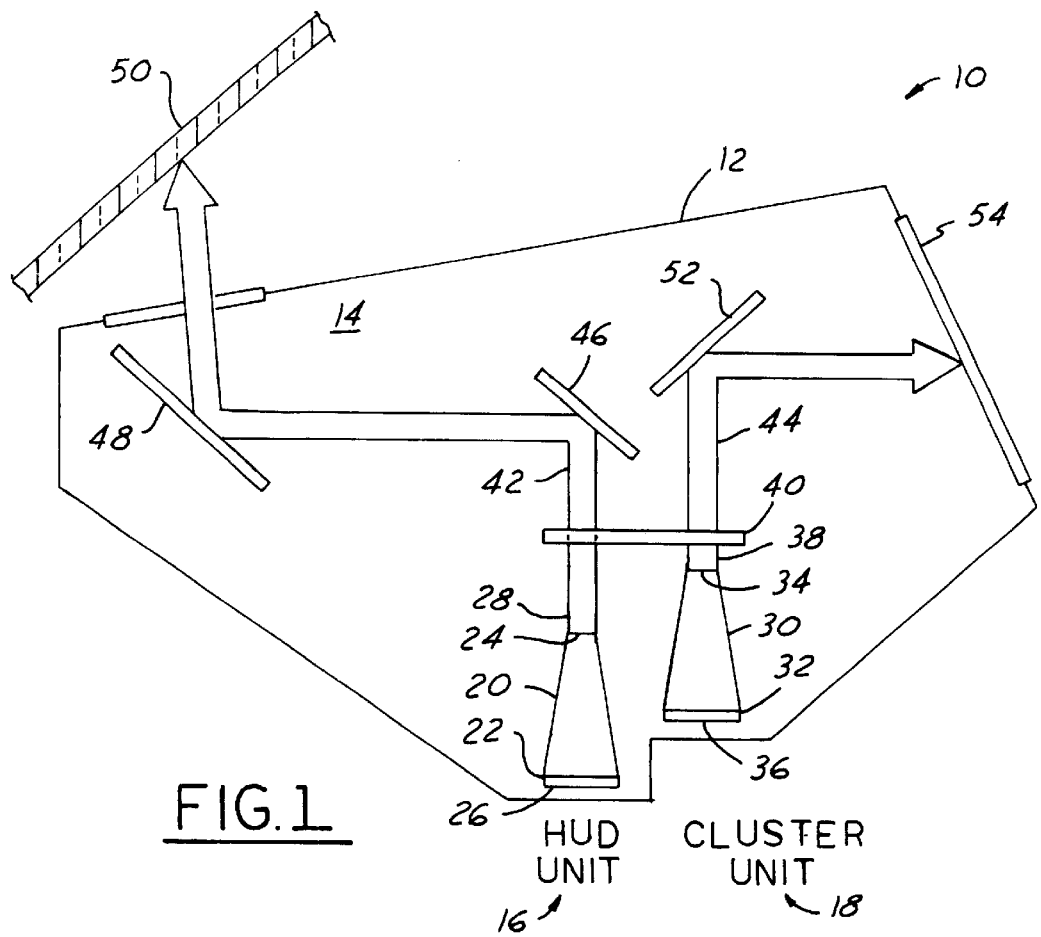
FIG. 1 illustrates an integrated heads up display (HUD) and cluster projection panel assembly in accordance with the present invention.

Referring now to FIG. 1, an integrated heads-up display (HUD) and cluster projection panel assembly 10 in accordance with the present invention is shown. Assembly 10 includes a housing 12 housing an integrated HUD and cluster projection panel 14. Integrated HUD and cluster projection panel 14 includes a HUD unit 16 and a cluster projection panel unit 18. HUD unit 16 includes an angle to area converter 20 having a large end 22 and a small end 24. An array of high brightness (low angular spread) light emitting diodes (LEDs) 26 load converter 20 at large end 22 with light. Converter 20 outputs a higher flux light beam 28 at a larger angle from small end 24 in response to light input by LEDs 26 at large end 22.

Similarly, cluster projection panel unit 18 includes an angle to area converter 30 having a large end 32 and a small end 34. An array of high brightness (low angular spread) LEDs 36 load converter 30 at large end 32 with light. Converter 30 outputs a higher flux light beam 38 at a larger angle in response to light input by LEDs 36 at large end 32.

HUD unit 16 and cluster projection panel unit 18 share a common display unit 40. Display unit 40 may be embodied as an LCD, an organic LED (a self-emissive display) a TFT-LCD, and the like. Display unit 40 includes an array of pixels. The pixels of display unit 40 are controlled to selectively transmit and reflect light to form images. The pixels of display unit 40 selectively transmit and reflect light by sequencing on and off. Converters 20 and 30 transmit light beams 28 and 38 toward display unit 40. Pixels of display unit 40 selectively transmit and reflect light from light beams 28 and 38 to form image light beams 42 and 44. Image light beams 42 and 44 are typically different images having shapes. For example, image light beam 42 forms HUD information and image light beam 44 forms cluster projection panel information. A first pixel array portion of display unit 40 is associated with converter 20 for forming image light beam 42. A second pixel array portion of display unit 40 is associated with converter 30 for forming image light beam 44.

The first pixel array portion of display unit 40 transmits image light beam 42 toward a fold mirror 46. Fold mirror 46 reflects image light beam 42 to a first projection optic 48. Projection optic 48 includes plastics for magnifying and projecting image light beam 42 onto a windscreen 50 of a motor vehicle for a vehicle operator to view. Image light beam 42 forms an image on windscreen 50 conveying HUD information for the operator to view while operating the vehicle. Projection optic 48 may also magnify and project image light beam 42 onto a different location of the vehicle for high heads-up display (HHD) information.

The second pixel array portion of display unit 40 transmits image light beam 44 toward a second projection optic 52. Projection optic 52 includes plastics for magnifying and projecting image light beam 44 onto a cluster projection screen 54 of the vehicle for the operator to view. Image light beam 44 forms an image on cluster projection screen 54 for the operator to view while operating the vehicle.

Figure 2:
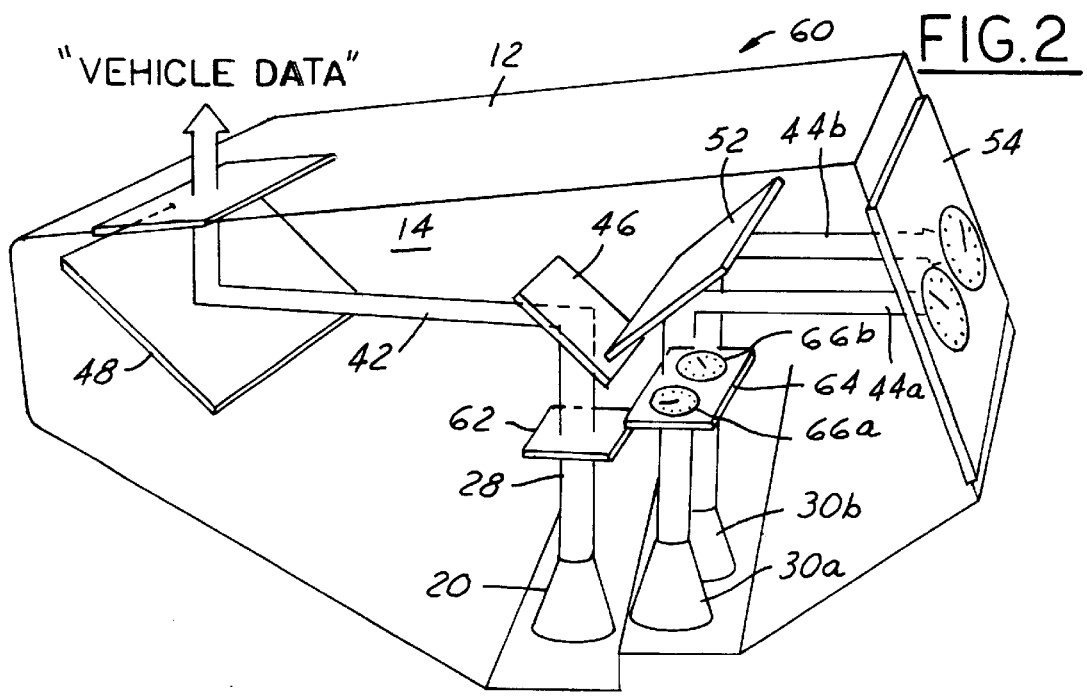
FIG. 2 illustrates a perspective view of the integrated HUD and cluster projection panel assembly in accordance with the present invention.

Referring now to FIG. 2, a perspective view of the integrated HUD and cluster projection panel assembly 60 in accordance with the present invention is shown. Assembly 60 generally includes the same elements as assembly 10 and like elements have identical reference numerals. Assembly 60 is different from assembly 10 in that assembly 60 includes two separated display units. Namely, a HUD display unit 62 and a cluster projection panel display unit 64. Each of display units 62 and 64 includes a pixel array for selectively forming image light beams. HUD unit 16 includes one converter 20 operating in conjunction with HUD display unit 62 for forming image light beam 42 on windscreen 50. Image light beam 42 conveys "vehicle data" information on windscreen 50 as shown in FIG. 2.

Cluster projection panel unit 18 includes two converters 30a and 30b. Each of converters 30a and 30b operate in conjunction with respective first and second portions 66a and 66b of display unit 64 for forming respective first and second image light beams 44a and 44b on cluster projection screen 54. Image light beams 44a and 44b convey RPM and vehicle speed projection type information on cluster projection panel 54 as shown in FIG. 2.

HUD unit 16 and cluster projection panel unit 18 of integrated HUD and cluster projection panel assemblies 10 and 60 both lend themselves to back lighting techniques. Back lighting techniques are used for providing different colors of the images on windscreen 50 and cluster projection screen 54. For example, LEDs 36 of cluster projection unit 18 include two LED sets. The first set of LEDs generates light sequentially on and off to be in sync with the pixels of display unit 40 turning on and off. The second set of LEDs generates light non-sequentially. That is, the second LED set generates light that is on all the time.

The first set of LEDs is in the inner rings of LEDs containing LEDs that can generate light having different colors (RGB). The second set of LEDs is in the outer rings of LEDs containing LEDs that generate light of one color. Display unit 40 works in conjunction with the first set of LEDs to project images having different colors on windscreen 50 and cluster projection screen 54. Display unit 40 works in conjunction with the second set of LEDs to project the background color of images on windscreen 50 and cluster projection screen 54.

While the best mode for carrying out the invention has been described in detail, those familiar with the art to which this invention relates will recognize various alternative designs and embodiments for practicing the invention as defined by the following claims.

What is claimed:

1. An integrated heads-up display (HUD) and cluster projection panel assembly for a motor vehicle, the assembly comprising:

a housing;

a common display unit contained within the housing, the display unit having first and second pixel arrays which are joined together side-by-side and turn on and off for forming different first and second image light beams in response to receiving light, the first and second image light beams being different from one another with the first image light beam forming HUD information and the second image light beam forming cluster projection panel information in which the cluster projection panel information is different than the HUD information;

a HUD unit and a cluster projection panel contained within the housing, the HUD unit and the cluster projection panel sharing the display unit;

the HUD unit having a first converter for transmitting light to the first pixel array of the display unit, the HUD unit further having a first projection optic for projecting the first image light beam from the first pixel array of the display unit onto a windscreen of the motor vehicle in order to project the HUD information onto the windscreen; and the cluster projection panel having a second converter for transmitting light to the second pixel array of the display unit, the cluster projection panel unit further having a second projection optic for projecting the second image light beam from the second pixel array of the display unit onto a cluster projection screen of the motor vehicle in order to project the cluster projection panel information onto the cluster projection screen.

2. The assembly of claim 1 wherein:

the HUD unit includes a first set of light emitting diodes (LEDs) for generating light for the first converter to transmit to the first pixel array of the display unit.

3. The assembly of claim 1 wherein:

the cluster projection panel unit includes a second set of light emitting diodes (LEDs) for generating light for second converter to transmit to the second pixel array of the display unit.

4. The assembly of claim 1 wherein:

the first converter of the HUD unit is an angle to area converter having a large end for receiving light from an external source and a small end for increasing flux at a higher angle for the light transmitted to the first pixel array of the display unit.

5. The assembly of claim 1 wherein:

the HUD unit includes two sets of light emitting diodes (LEDs) for generating light for the first converter to transmit to the first pixel array of the display unit, wherein the first set of LEDs generates light having one color and the second set of LEDs generates light having multiple colors.

6. The assembly of claim 5 wherein:

the first pixel array of the display unit forms a first image light beam having one color in response to receiving light from the first set of LEDs.

7. The assembly of claim 5 wherein:

the second pixel array of the display unit forms a second image light beam having multiple colors in response to receiving light from the second set of LEDs.

8. The assembly of claim 5 wherein:

the first set of LEDs generates the light having one color continuously.

9. The assembly of claim 5 wherein:

the second set of LEDs generates the light having multiple colors sequentially to be in synchronicity with the turning on and off of the pixels of the second pixel array of the display unit.

* * * * *